US008004396B2

(12) United States Patent
Liu et al.

(10) Patent No.: US 8,004,396 B2
(45) Date of Patent: Aug. 23, 2011

(54) SYSTEM AND METHOD FOR INFORMATION INTEGRATION

(75) Inventors: Chih-Yuan Liu, Hsinchu (TW); Lun-Chia Kuo, Hsinchu (TW); Chung-Yi Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 345 days.

(21) Appl. No.: 12/128,777

(22) Filed: May 29, 2008

(65) Prior Publication Data

US 2009/0002189 A1 Jan. 1, 2009

Related U.S. Application Data

(60) Provisional application No. 60/929,464, filed on Jun. 28, 2007.

(51) Int. Cl.
*G08B 29/00* (2006.01)
*G05B 11/01* (2006.01)

(52) U.S. Cl. ........ 340/506; 340/522; 340/531; 340/525; 340/539.14; 700/17

(58) Field of Classification Search .................. 340/506, 340/522, 525
See application file for complete search history.

(56) References Cited

U.S. PATENT DOCUMENTS

| | | | | |
|---|---|---|---|---|
| 5,086,385 A | * | 2/1992 | Launey et al. | 700/83 |
| 6,480,753 B1 | * | 11/2002 | Calder et al. | 700/83 |
| 6,580,950 B1 | * | 6/2003 | Johnson et al. | 700/17 |
| 2003/0101459 A1 | * | 5/2003 | Edson | 725/82 |
| 2005/0219048 A1 | * | 10/2005 | Kimmel et al. | 340/511 |

FOREIGN PATENT DOCUMENTS

| | | |
|---|---|---|
| CN | 2671261 | 1/2005 |
| CN | 1888986 | 1/2007 |
| JP | 2002-244606 | 8/2002 |
| JP | 2006-48174 | 2/2006 |
| JP | 2006-84922 | 3/2006 |
| WO | WO 2006051970 | 5/2006 |

OTHER PUBLICATIONS

The First Office Action from the State Intellectual Property Office of People's Republic of China for Chinese Application No. 200810131765.3, dated Mar. 26, 2010.
Office Action for Application No. 2008-155627, from the Japanese Patent Office, dated Dec. 14, 2010.

* cited by examiner

*Primary Examiner* — Donnie L Crosland
(74) *Attorney, Agent, or Firm* — Finnegan, Henderson, Farabow, Garrett & Dunner, LLP (57) ABSTRACT

An information integration system for integrating information includes: a local information receiving unit configured to receive information from a plurality of sensors; an information collecting unit configured to collect information from a plurality of remote information sources; and an information processing unit coupled to the local information receiving unit and the information collecting unit, the information processing unit being configured to process the information received by the local information receiving unit and the information collected by the information collecting unit.

38 Claims, 5 Drawing Sheets

SYSTEM AND METHOD FOR INFORMATION INTEGRATION

RELATED APPLICATIONS

This application is based upon and claims the benefit of priority from U.S. Provisional Patent Application No. 60/929,464, filed Jun. 28, 2007, the entire contents of which are incorporated herein by reference.

FIELD OF THE INVENTION

This invention pertains in general to systems and methods for information integration and, more particularly, to systems and methods for information collection and display.

BACKGROUND OF THE INVENTION

In everyday life, one may want different aspects of information relating to home life. For example, one may want to know air quality or temperature in his or her home. Also for example, one may want to check a security status of the home. As a further example, one may want to measure his or her own or a family member's blood pressure to protect against health problems. As another example, one may want to read news or check weather information.

The above information is usually provided by different sources. For example, the air quality may be provided by an air monitoring device and the temperature may be provided a thermometer. The home security status may be provided a security monitoring system installed in the home. The blood pressure may be provided by a blood pressure monitor. The news or the weather information may be provided by a web site on the Internet.

The different information sources are usually distributed at different locations. It may be inconvenient for one to check the different information sources in order to have different information he or she may want.

SUMMARY OF THE INVENTION

In accordance with the invention, there is provided an information integration system, comprising: a local information receiving unit configured to receive information from a plurality of sensors; an information collecting unit configured to collect information from a plurality of remote information sources; and an information processing unit coupled to the local information receiving unit and the information collecting unit, the information processing unit being configured to process the information received by the local information receiving unit and the information collected by the information collecting unit.

Also in accordance with the invention, there is provided an information integration method, comprising: receiving information from a plurality of sensors distributed in a local area; collecting information from a plurality of remote information sources; and processing the information received from the plurality of sensors and the information collected from the plurality of remote information sources.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1A:
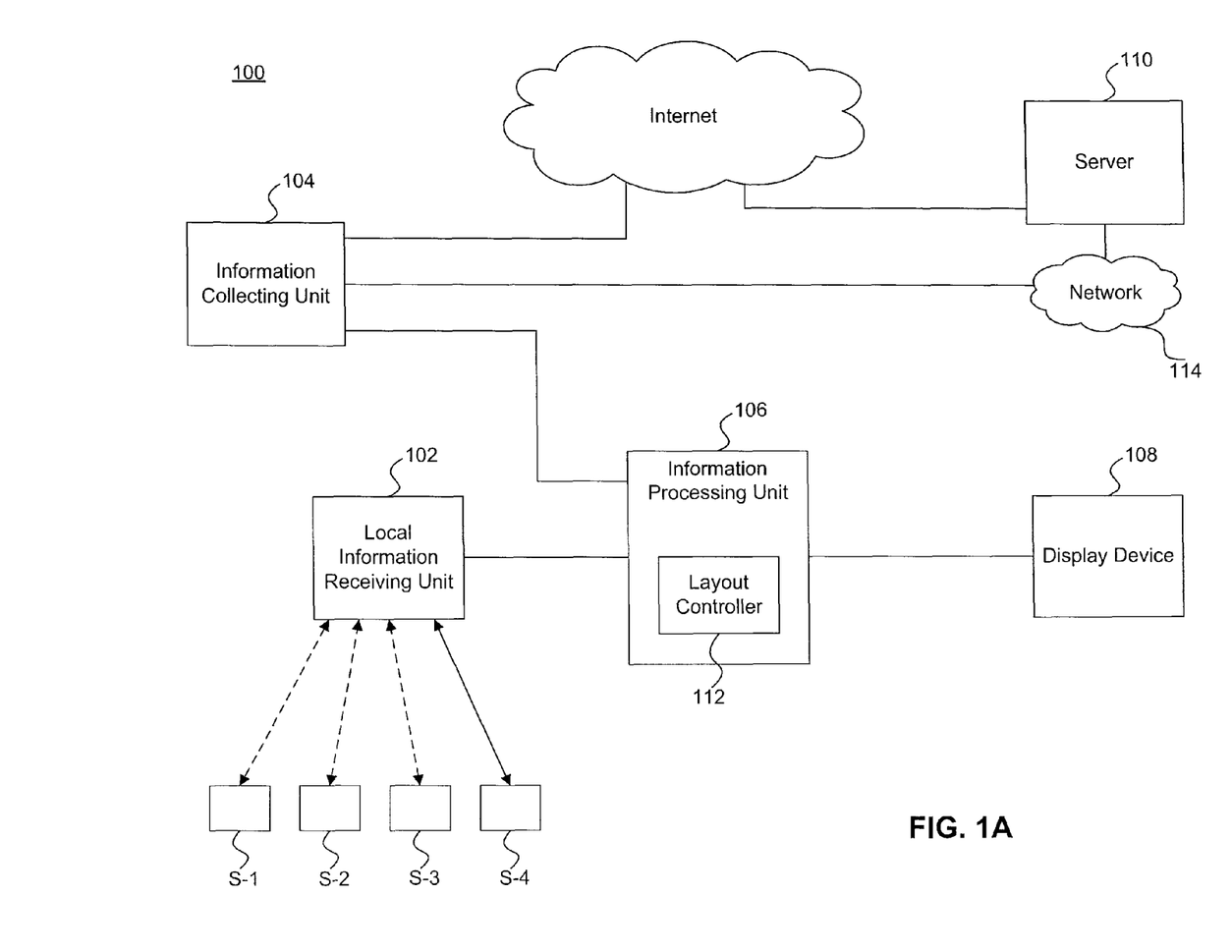
FIG. 1A illustrates a schematic block diagram of an information integration system, according to an exemplary embodiment.

FIG. 1A illustrates a schematic block diagram of an information integration system 100, according to an exemplary embodiment. The information integration system 100 may include a local information receiving unit 102, an information collecting unit 104, an information processing unit 106 coupled to the local information receiving unit 102 and the information collecting unit 104, and a display device 108 coupled to the information processing unit 106. For example, the information integration system 100 may be integrated into a computer. Also for example, the information integration system 100 may be embodied in a device configured for use in the system 100. The information integration system 100 may be further coupled to a server 110 through a network 114. In the illustrated embodiment, the information collecting unit 104 of the information integration system 100 is coupled to the server 110 through the network 114. The network 114 may be the Internet, a third generation (3G) network, or a local area network (LAN).

In exemplary embodiments consistent with the present invention, the server 110 may coordinate with the information collecting unit 104 to collect information from a plurality of remote information sources, such as Internet web sites or servers specified by a user of the information integration system 100, which will be described below. The user may specify a plurality of web sites or servers on the Internet through the server 110. The user may also set parameters of the information integration system 100 through the server 110. For example, the user may set display or layout parameters for the display device 108 through the server 110, which will be described below. Also for example, the server 110 may include an input device and a display device (not shown) for the user to set parameters of the information integration system 100. The display device 108 may also be used to facilitate parameter setting.

In exemplary embodiments consistent with the present invention, a plurality of information integration systems each having substantially the same schematic block diagram as the information integration system 100 may be coupled to the server 110. The plurality of information integration systems are located in different local areas such as a home, an office, or a business building. A user of a first one of the plurality of information integration systems may set parameters for a second one of the plurality of information integration systems through the server 110.

Each of the local information receiving unit 102, the information collecting unit 104, and the information processing unit 106 of the information integration system 100 may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, etc.

In exemplary embodiments consistent with the present invention, the local information receiving unit 102 is configured to receive information, which may be updated in real-time, collected by a plurality of sensors distributed in a local area such as a home, an office, or a business building of a user of the system 100, and to provide the received information for the processing unit 106 to further process. Each of the plurality of sensors may detect an information item, e.g., temperature or humidity in the home, that the user may want to know. For convenience of illustration only, it is assumed the plurality of sensors include first, second, third, and fourth sensors S-1, S-2, S-3, and S-4 distributed in the home. However, the plurality of sensors may include any number of sensors distributed in any local area.

For example, the sensor S-1 may detect air quality in the home and send information regarding the air quality to the local information receiving unit 102. The sensor S-2 may measure temperature in the home and send information regarding the temperature to the local information receiving unit 102. The sensor S-3 may monitor a security status of the home and send information regarding the security status to the local information receiving unit 102. The sensor S-4 may measure the user's blood pressure and send information regarding the blood pressure to the local information receiving unit 102.

Each of the plurality of sensors may communicate with the local information receiving unit 102 wirelessly or through a cable. For example, the sensors S-1, S-2, and S-3 may send their collected information to the local information receiving unit 102 wirelessly, which is diagrammatically illustrated in FIG. 1A by broken line connections between the sensors S-1, S-2, S-3 and the local information receiving unit 102. Also for example, the sensor S-4 may send its detected information to the local information receiving unit 102 through a cable, which is diagrammatically illustrated in FIG. 1A by a solid line connection between the sensor S-4 and the local information receiving unit 102.

In the illustrated embodiment, each of the sensors S-1, S-2, and S-3 communicates with the local information receiving unit 102 wirelessly based on a communication standard. For example, the sensors S-1, S-2, and S-3 may communicate with the local information receiving unit 102 based on the same communication standard such as a ZigBee standard, a Z-Wave standard, or a Bluetooth standard. Also for example, each of the sensors S-1, S-2, and S-3 may communicate with the local information receiving unit 102 based on one of the ZigBee standard, the Z-Wave standard, and the Bluetooth standard.

In exemplary embodiments consistent with the present invention, the information collecting unit 104 is configured to collect information from a plurality of remote information sources. For example, the information collecting unit 104 is configured to collect information, which may be updated in real-time, from a plurality of Internet web sites or servers specified by the user through, e.g., the server 110, and to provide the collected information for the information processing unit 106 to further process. Also for example, if the user is interested in news provided by a web site, the user may set the information collecting unit 104 to collect the news from that web site. Further for example, if the user wants to know weather information, the user may set the information collecting unit 104 to collect the weather information from a web site providing such weather information.

In exemplary embodiments consistent with the present invention, the information collecting unit 104 may collect information that has different formats. The information collecting unit 104 may also collect information from web sites based on different communication protocols. For example, the information collecting unit 104 may collect information from a web site that uses a Really Simple Syndication (RSS) format, where the RSS is a method that uses an Extensible Markup Language (XML) to distribute web content on a web site to other web sites. Also for example, the information collecting unit 104 may collect information from a web site based on a File Transfer Protocol (FTP) or a Hypertext Transfer Protocol (HTTP). Further for example, the information collecting unit 104 may collect the user's electronic mail from an electronic mail server. Accordingly, in the illustrated embodiment, the collected information may have an RSS format, an FTP format, an HTTP format, or an electronic mail format.

In exemplary embodiments consistent with the present invention, the information collecting unit 104 may operate in an active mode or a passive mode. In the active mode, the information collecting unit 104 may intermittently collect information from the plurality of web sites. In the passive mode, the server 110 may have a listing of the plurality of web sites specified by the user and collect information from the plurality of web sites, and the information collecting unit 104 may receive the collected information from the server 110.

In exemplary embodiments consistent with the present invention, the information processing unit 106 is configured to receive the information provided by the local information receiving unit 102 and the information collecting unit 104, and to process the received information. The information processing unit 106 may then send the processed information to the display device 108 for display. For example, the information processing unit 106 may perform image or sound processing of the received information. Also for example, the information processing unit 106 may process the received information based on a format, e.g., the RSS format, of the received information. As a further example, the information processing unit 106 may process the received information based on a type of one of the plurality of sensors which collected the received information, such as a type of sensor to detect humidity or a type of sensor to detect temperature. As another example, the information processing unit 106 may further analyze the processed information.

In one exemplary embodiment, the information processing unit 106 may include a layout controller 112 configured to arrange the processed information according to a layout template to form a layout for the display device 108 to display.

Figure 1B:
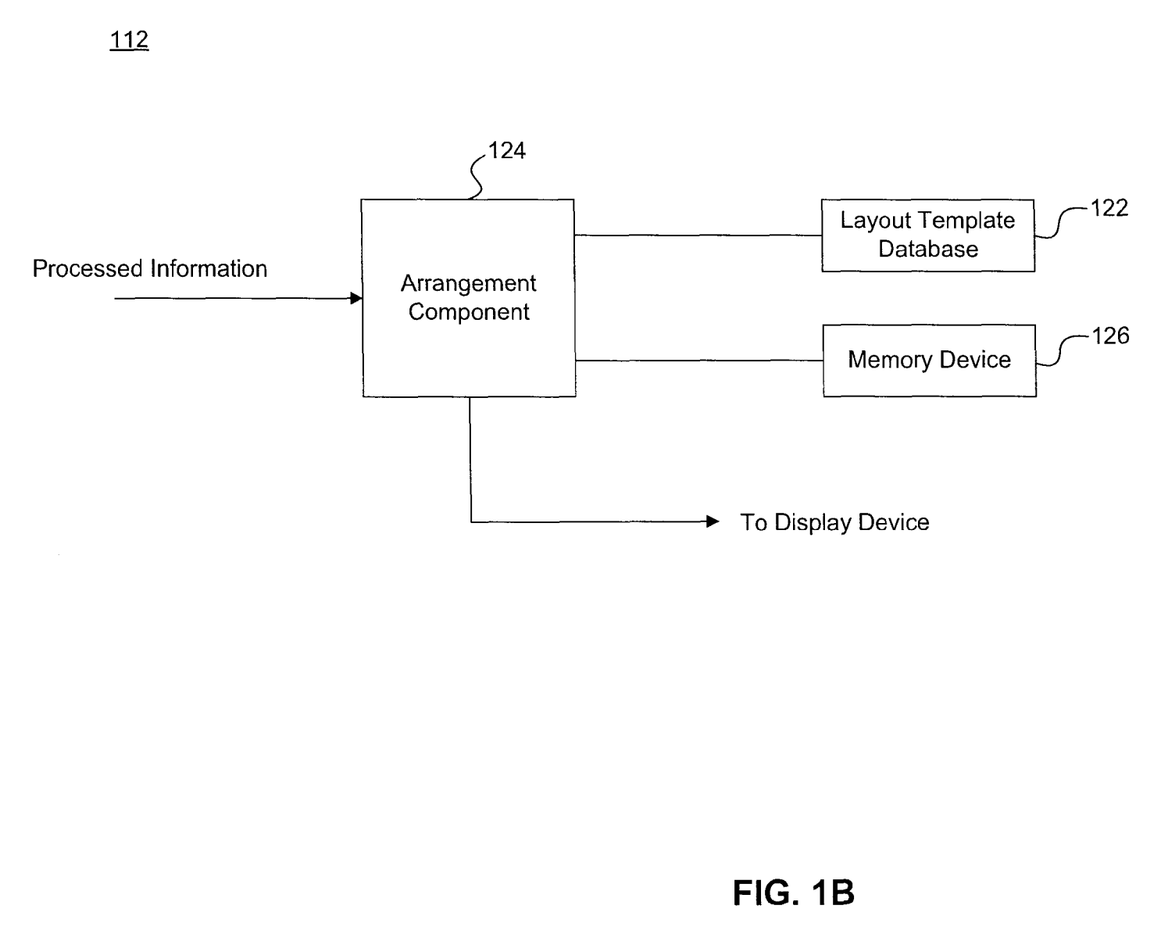
FIG. 1B illustrates a block diagram of a layout controller, according to an exemplary embodiment.

FIG. 1B illustrates a block diagram of the layout controller 112, according to an exemplary embodiment. Referring to FIGS. 1A and 1B, the layout controller 112 may include a layout template database 122, an arrangement component 124, and a memory device 126. Both the layout template database 122 and the memory device 126 are coupled to the arrangement component 124.

In exemplary embodiments consistent with the present invention, the layout template database 122 is configured to provide a layout template and/or layout arrangement rules for the arrangement component 124. For example, the layout template database 122 may pre-store a plurality of layout templates for the arrangement component 124 to select. Also for example, the user may design a layout template and save the designed layout template in the layout template database 122. Further for example, if the user prefers a specific information item, such as the humidity in the home, to be displayed at the top of a display screen of the display device 108, the user may set the layout arrangement rules through, e.g., the server 110, such that the specific information item would be displayed at the top of the display screen of the display device 108.

In exemplary embodiments consistent with the present invention, the arrangement component 124 is configured to receive the information processed by the information processing unit 106, and arrange the processed information according to a layout template selected from the layout template database 122 to form a layout. For example, the layout may include a plurality of information items each corresponding to information received from one of the plurality of sensors S-1, S-2, S-3, S-4 or information collected from one of the plurality of web sites. In addition, the arrangement component 124 may arrange the processed information based on one of the layout arrangement rules provided by the layout template database 122. For example, the arrangement component 124 may arrange the specific information item to be displayed at the top of the display screen of the display device 108, based on the layout arrangement rules set by the user.

The arrangement component 124 may save in the memory device 126 display parameters of each of the plurality of information items in the layout. The display parameters of one of the information items may include a length and a width of an area for displaying the one of the information items, or an adjustment range of the length and the width. The display parameters of the one of the information items may also include a location in the layout template for arranging the one of the information items and a format, e.g., a number format or a text format, of the one of the information items. In exemplary embodiments consistent with the present invention, the user may edit the display parameters.

After the layout controller 112 arranges the processed information in the layout template to form the layout, the information processing unit 106 may send the processed information to the display device 108 for display.

In exemplary embodiments consistent with the present invention, the user of the system 100 may remove an existing sensor from, or add a new sensor to, the plurality of sensors. For example, the user may no longer be interested in monitoring the home temperature. Therefore the user may remove the sensor S-2. Also for example, the user may become interested in the humidity in the home. As a result, the user may add a new sensor S-5 (not shown) to detect the home humidity. The new sensor S-5 may send information regarding the humidity in the home to the local information receiving unit 102.

Figure 2:
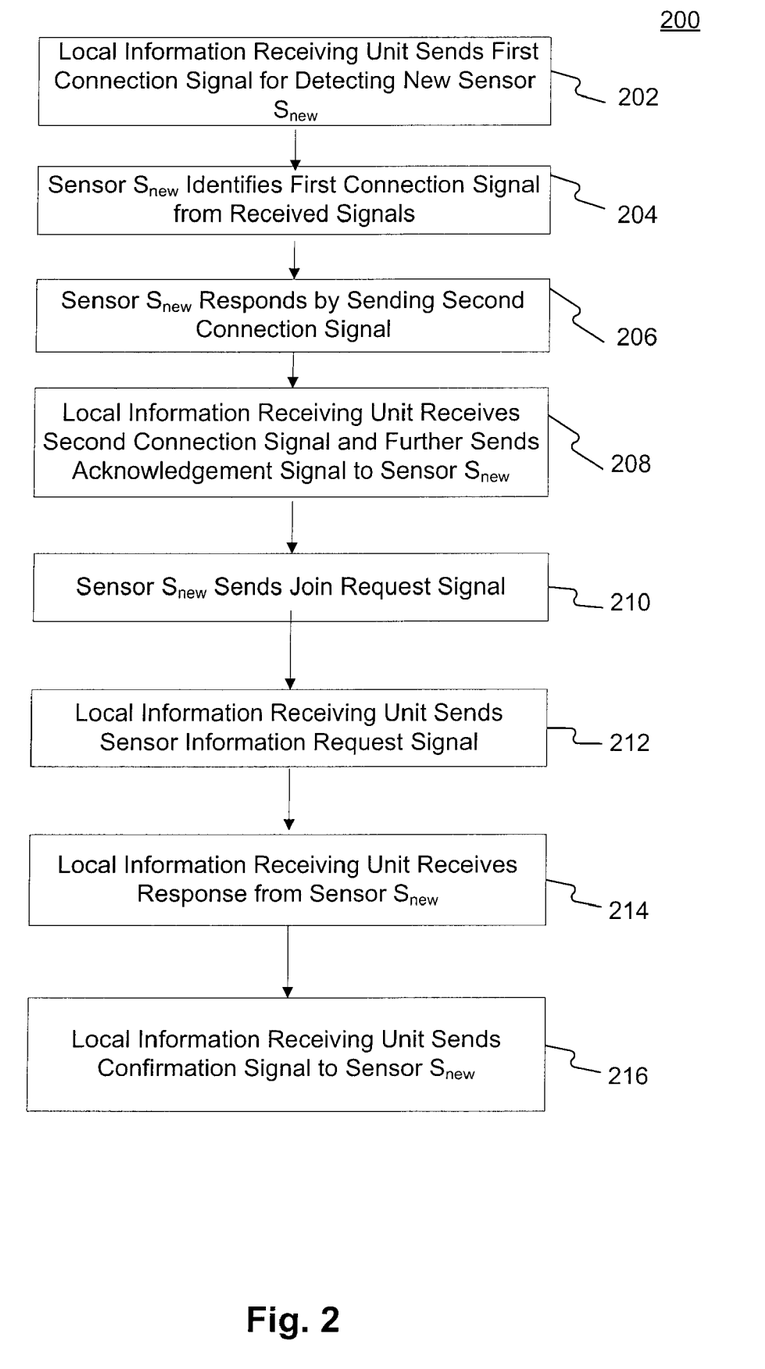
FIG. 2 illustrates a flow chart of a method for a local information receiving unit to establish communication with a new sensor, according to an exemplary embodiment.

FIG. 2 illustrates a flow chart 200 of a method for the local information receiving unit 102 (FIG. 1A) to establish communication with a new sensor $S_{new}$, according to an exemplary embodiment. For example, the new sensor $S_{new}$ may be the sensor S-5 to detect the humidity in the home. Referring to FIG. 2, the local information receiving unit 102 sends a first connection signal for detecting the new sensor $S_{new}$ (step 202). For example, the user may push a button on the local information receiving unit 102 to trigger the local information receiving unit 102 to send the first connection signal. Also for example, the local information receiving unit 102 may intermittently send the first connection signal. The first connection signal may include data regarding an identity SruID of the local information receiving unit 102. After sending the first connection signal, the local information receiving unit 102 waits for a response from the sensor $S_{new}$ for a prescribed period of time, e.g., five seconds. If the local information receiving unit 102 does not receive the response within the prescribed period of time, the local information receiving unit 102 may stop the detection process.

The sensor $S_{new}$ may receive one or more interference signals in addition to the first connection signal. The sensor $S_{new}$ may identify the first connection signal from the received signals (step 204). For example, the user may push a button on the sensor $S_{new}$ to trigger the sensor $S_{new}$ to check the received signals. Also for example, the sensor $S_{new}$ may intermittently check the received signals. The sensor $S_{new}$ may identify the first connection signal from the received signals by identifying the identity SruID of the local information receiving unit 102. After identifying the first connection signal, the sensor $S_{new}$ responds by sending a second connection signal (step 206). The second connection signal may include information regarding an identity SensorID of the sensor $S_{new}$. In the illustrated embodiment, the identity SensorID may be associated with the sensor $S_{new}$ since the sensor $S_{new}$ was manufactured.

In one exemplary embodiment, the local information receiving unit 102 receives the second connection signal and further sends an acknowledgement signal to the sensor $S_{new}$ (step 208). The acknowledgement signal indicates an initial connection has been established between the local information receiving unit 102 and the sensor $S_{new}$. Upon receiving the acknowledgement signal, the sensor $S_{new}$ may send a join request signal to request that the local information receiving unit 102 accept information collected by the sensor $S_{new}$ (step 210). In response, the local information receiving unit 102 assigns a network identity NetworkID to the sensor $S_{new}$ and creates a listing including the identity SensorID and the network identity NetworkID of the sensor $S_{new}$.

Next, the local information receiving unit 102 sends a sensor information request signal to the sensor $S_{new}$ (step 212), requesting information regarding a type SensorType of the sensor $S_{new}$, such as a type of sensor to detect humidity or a type of sensor to detect temperature, and an initial value of the information collected by the sensor $S_{new}$. Based on a response received from the sensor $S_{new}$ (step 214), the local information receiving unit 102 adds the type SensorType of the sensor $S_{new}$ and the initial value of the information collected by the sensor $S_{new}$ to the listing noted above, and sends a confirmation signal to the sensor $S_{new}$ indicating the local information receiving unit 102 is ready to accept the information collected by the sensor $S_{new}$ (step 216).

Referring back to FIGS. 1A and 1B, the layout controller 112 may dynamically adjust a layout currently displayed on the display device 108, when the user adds the new sensor S-5 to the plurality of sensors or the user specifies a new website where the information collecting unit 104 may collect information. For example, when the user adds the new sensor S-5 to the plurality of sensors, a new information item corresponding to the information received from the new sensor S-5, i.e., the humidity of the home, may appear on the display device 108. The layout controller 112 may arrange information processed by the information processing unit 106, which includes the information collected by the sensor S-5, according to a new layout template to form a new layout for the display device 108 to display.

In one exemplary embodiment, the arrangement component 124 may be notified when the new sensor S-5 is added to the plurality of sensors. The arrangement component 124 may then dynamically adjust the layout currently displayed on the display device 108 such that the processed information including the information received from the sensor S-5 may be appropriately displayed. For example, the arrangement component 124 may check the display parameters of each of the information items that are currently in the layout, which are stored in the memory device 126, and then select the new layout template from the layout template database 122 to form the new layout, based on display parameters of the new information item.

Figure 3:
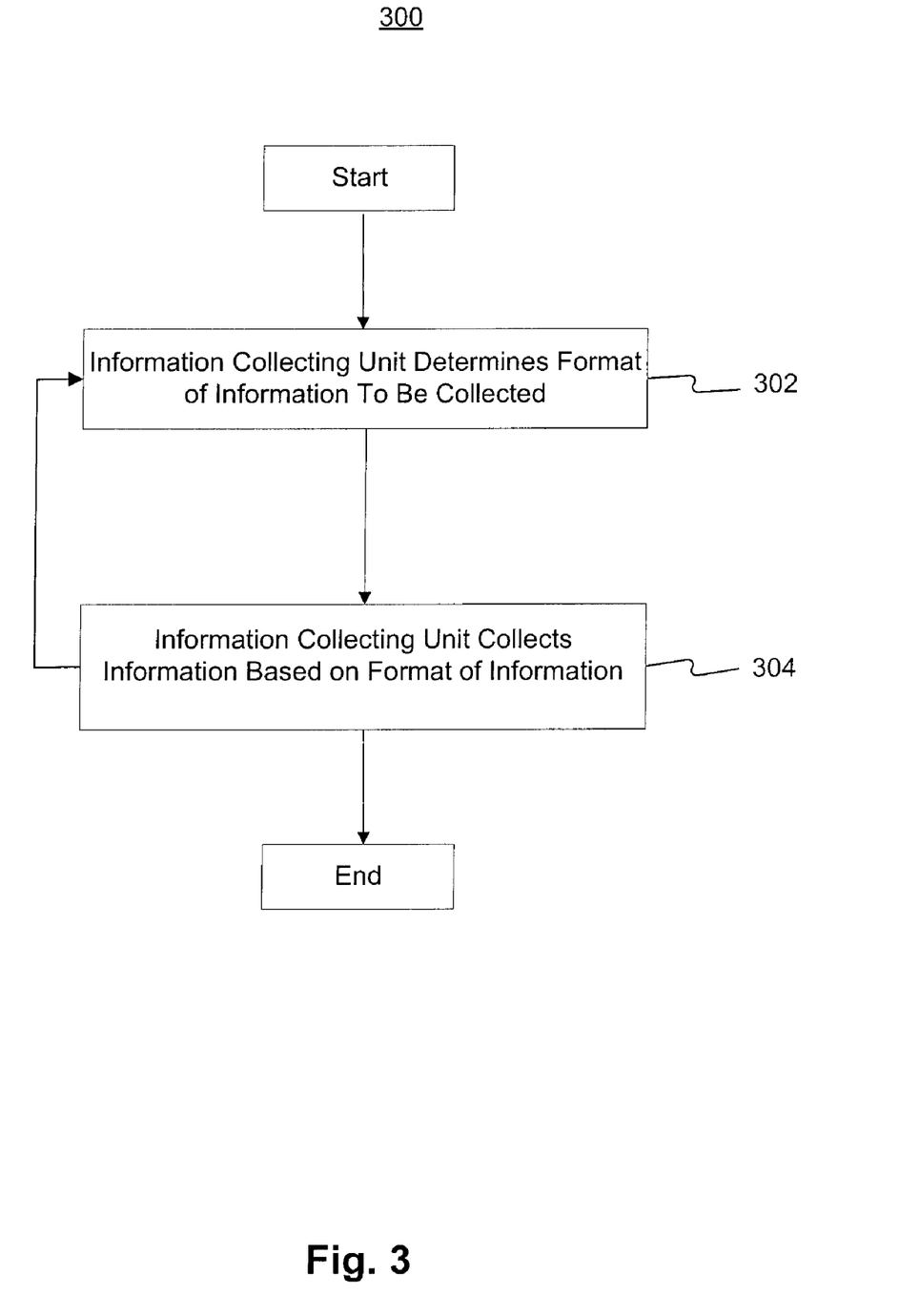
FIG. 3 illustrates a flow chart of a method for an information collecting unit to operate in an active mode, according to an exemplary embodiment.

FIG. 3 illustrates a flow chart 300 of a method for the information collecting unit 104 (FIG. 1A) to operate in the active mode noted above, according to an exemplary embodiment. Referring to FIG. 1A and FIG. 3, in the active mode, the information collecting unit 104 intermittently collects information from the plurality of web sites. For example, in the active mode, the information collecting unit 104 may periodically collect information from the plurality of web sites.

The information collecting unit 104 determines a format of the information to be collected (step 302). For example, the information collecting unit 104 may determine the information to be collected has the FTP format or the HTTP format. Also for example, the information collecting unit 104 may determine the information to be collected has the RSS format. Further for example, the information collecting unit 104 may determine the information to be collected has the electronic mail format. The information collecting unit 104 then collects the information based on the format of the information (step 304), and send the collected information to the information processing unit 106 for further processing. Steps 302-304 are repeated as long as the information integration system 100 is in operation.

Figure 4:
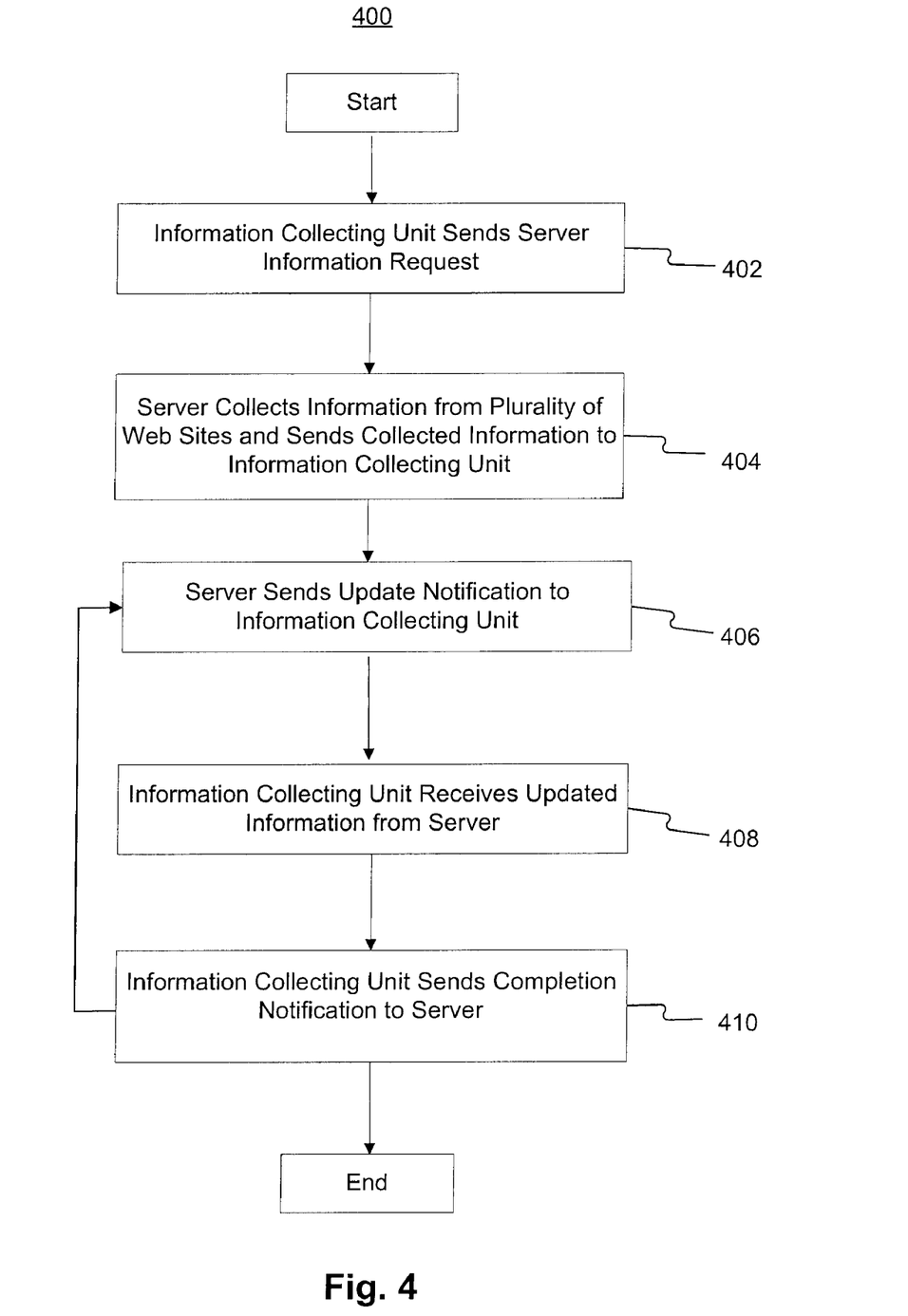
FIG. 4 illustrates a flow chart of a method for an information collecting unit to operate in a passive mode, according to an exemplary embodiment.

FIG. 4 illustrates a flow chart 400 of a method for the information collecting unit 104 (FIG. 1A) to operate in the passive mode noted above, according to an exemplary embodiment. Referring to FIG. 1A and FIG. 4, in the passive mode, the information collecting unit 104 sends the server 110 an information request, and then waits for a response from the server 110 (step 402). After receiving the information request from the information collecting unit 104, the server 110 may collect information from the plurality of web sites in the listing noted above and send the collected information to the information collecting unit 104 (step 404). In addition, the server 110 may further monitor whether there is updated information on any one of the plurality of web sites.

If the server 110 identifies updated information on one of the plurality of web sites in the listing, the server 110 collects the updated information from the one of the plurality of web sites and sends an update notification to the information collecting unit 104 (step 406). The information collecting unit 104 then receives the updated information from the server 110 (step 408). After receiving the updated information, the information collecting unit 104 sends a completion notification to the server 110 (step 410), and also sends the received information to the information processing unit 106 for further processing. Steps 406-410 are repeated as long as the information integration system 100 is in operation.

Referring back to FIG. 1A, in one exemplary embodiment, the information integration system 100 may provide adaptive information, that is, supplemental information, for the user based on the information processed by the information processing unit 106. For example, when the information processing unit 106 analyzes the processed information and determines the temperature in the home is high, the information processing unit 106 may provide an advertisement of, e.g., air-conditioners or cool drinks, and broadcast the advertisement on the display device 108. In one exemplary embodiment, information regarding the advertisement may be transmitted from the server 110, or a server (not shown) on the Internet.

In addition, the information integration system 100 may monitor a status such as a security status of the home and, when a situation or emergency happens, provide the user with a suggestion regarding how to handle the situation. For example, when the information processing unit 106 analyzes the processed information and determines the temperature in the home is uncommonly high and there is a fire danger, the information processing unit 106 may broadcast a short video on the display device 108 to show the user how to handle the situation. Also, for example, contact information of police, hospitals, or friends of the user may be stored in the server 110. When the information processing unit 106 analyzes the processed information and determines that an emergency situation exists, the information processing unit 106 may send a notification to the server 110. The server 110 may then notify the police, the hospitals, or the friends of the user. The server 110 may also notify the user by, e.g., sending an electronic mail to the user.

In one exemplary embodiment, the user may set parameters of the system 100 through an interface provided by the server 110. For example, the user may set a threshold temperature through a web site provided by the server 110. Accordingly, the information processing unit 106 may determine there is the fire danger if the processed information indicates the temperature in the home is close to the threshold temperature. Also for example, through the web site provided by the server 110, the user may edit the layout templates stored in the layout template database of the information processing unit 106.

In one exemplary embodiment, the information integration system 100 may determine whether the plurality of sensors are operating properly, based on communication signals from the plurality of sensors to the local information receiving unit 102. For example, if the local information receiving unit 102 determines, based on the network identity of the sensor S-1, that the communication signal from the sensor S-1 is relatively weak, a first suggestion, which suggests that the user change a location of the sensor S-1, may be displayed on the display device 108. Also for example, the local information receiving unit 102 may analyze stability of a wireless network including the local information receiving unit 102 and ones of the plurality of sensors which wirelessly communicate with the local information receiving unit 102. If the local information receiving unit 102 determines there is a need to improve the stability of the wireless network, a second suggestion, which suggests that the user improve the stability of the wireless network, may be displayed on the display device 108. In addition, the user may also check operation statuses of the plurality of sensors through the web site provided by the server 110.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An information integration system for integrating information, comprising:
   a local information receiving unit configured to receive information from a plurality of sensors;
   an information collecting unit configured to collect information from a plurality of remote information sources;
   an information processing unit coupled to the local information receiving unit and the information collecting unit, the information processing unit being configured to process the information received by the local information receiving unit and the information collected by the information collecting unit, and to provide:
   the processed information; and
   supplemental information based on the processed information;
   a first server coupled with the information collecting unit through a network,
   wherein the remote information sources include one or more Internet servers, and the information collecting unit is further configured to collect the information from the Internet servers in an active mode and in a passive mode,
   in the active mode, the information collecting unit intermittently collects the information from the Internet servers, and
   in the passive mode, the information collecting unit sends an information request for the first server to collect the information from the Internet servers and to send the collected information to the information collecting unit.

2. The system of claim 1, wherein the plurality of sensors are distributed within or near a home of a user of the system.

3. The system of claim 1, wherein each of the plurality of sensors has an identity assigned by the local information receiving unit.

4. The system of claim 3, wherein the local information receiving unit is configured to monitor an operation status of one of the plurality of sensors, based on the identity of the one of the plurality of sensors.

5. The system of claim 1, wherein one of the plurality of sensors is configured to communicate with the local information receiving unit wirelessly.

6. The system of claim 1, wherein one of the plurality of sensors is configured to communicate with the local information receiving unit through a cable.

7. The system of claim 1, wherein the first server is configured to set parameters for any one of a plurality of information integration systems coupled to the first server.

8. The system of claim 1, wherein the information collecting unit is configured to collect the information from the plurality of remote information sources intermittently.

9. The system of claim 1, wherein the information collecting unit is configured to determine a format of information collected from one of the plurality of remote information sources.

10. The system of claim 1, wherein the information processing unit comprises a layout controller configured to arrange the processed information according to a layout template to form a layout based on a total number of information items, each of the information items corresponding to information received from one of the plurality of sensors or information collected from one of the plurality of remote information sources.

11. The system of claim 10, wherein the layout controller is configured to dynamically adjust the layout.

12. The system of claim 10, wherein the layout controller comprises:
   a layout template database configured to store a plurality of layout templates; and
   an arrangement component coupled to the layout template database, the arrangement component being configured to select the layout template from the plurality of layout templates, and to arrange the processed information according to the layout template to form the layout.

13. The system of claim 10, wherein the layout controller comprises:
   a layout template database configured to store a plurality of layout arrangement rules; and
   an arrangement component coupled to the layout template database, the arrangement component being configured to arrange the processed information in the layout template to form the layout, based on one of the plurality of layout arrangement rules.

14. The system of claim 1, further including a display device coupled to the information processing unit to display the processed information.

15. The system of claim 14, wherein the information processing unit is configured to display the supplemental information on the display device.

16. The system of claim 1, wherein the first server is configured to collect the information from the plurality of remote information sources, and the information collecting unit is configured to receive the information collected by the first server.

17. The system of claim 1, wherein the first server is configured to provide an interface for a user to set parameters of the system.

18. The system of claim 1, wherein the first server is configured to send an emergency notification when the information processing unit determines existence of an emergency situation, based on the processed information.

19. The system of claim 1, further including a display device coupled to the information processing unit to display the processed information.

20. The system of claim 19, wherein the information processing unit is configured to display the supplemental information on the display device.

21. The system of claim 19, wherein the information processing unit is configured to provide an advertisement based on the information received by the local information receiving unit, and to display the advertisement on the display device.

22. The system of claim 21, wherein the information processing unit is configured to receive information regarding the advertisement from the first server or at least one of the Internet servers.

23. An information integration method for integrating information, comprising:
   receiving information from a plurality of sensors distributed in a local area;
   collecting information from a plurality of remote information sources;

processing the information received from the plurality of sensors and the information collected from the plurality of remote information sources;

providing the processed information, and supplemental information based on the processed information;

wherein the remote information sources include one or more Internet servers, the collecting further comprising:
intermittently collecting, in an active mode, the information from the Internet servers; and
sending, in a passive mode, an information request for a first server to collect the information from the Internet servers.

24. The method of claim 23, further comprising displaying the processed information.

25. The method of claim 23, wherein the plurality of sensors are distributed within or near a home.

26. The method of claim 23, wherein the receiving comprises receiving information from one of the plurality of sensors wirelessly.

27. The method of claim 23, wherein the receiving comprises receiving information from one of the plurality of sensors through a cable.

28. The method of claim 23, wherein the collecting comprises collecting the information from the plurality of remote information sources intermittently.

29. The method of claim 23, wherein the collecting comprises collecting the information from the plurality of remote information sources through a server.

30. The method of claim 23, wherein the processing comprises:
arranging the processed information in a layout template to form a layout based on a total number of information items, each of the information items corresponding to information received from one of the plurality of sensors or information collected from one of the plurality of remote information sources.

31. The method of claim 23, further comprising providing the supplemental information based on information received from one of the plurality of sensors.

32. An information integration system for integrating information, comprising:
a local information receiving unit configured to receive information from a plurality of sensors;
an information collecting unit configured to collect information from a plurality of remote information sources; and
an information processing unit coupled to the local information receiving unit and the information collecting unit, the information processing unit being configured to process the information received by the local information receiving unit and the information collected by the information collecting unit, and to provide:
the processed information; and
supplemental information based on the processed information;
wherein the sensors are configured to wirelessly communicate with the local information receiving unit based on a communication standard, and to dynamically connect or disconnect with the local information receiving unit.

33. The system of claim 32, wherein the information processing unit comprises a layout controller configured to dynamically adjust a layout displayed on a display device when a sensor connects or disconnects with the local information receiving unit.

34. The system of claim 32, wherein the information processing unit comprises:
a layout template database configured to store a plurality of layout arrangement rules; and
an arrangement component coupled to the layout template database, the arrangement component being configured to arrange the processed information in the layout template to form a layout, based on the layout arrangement rules.

35. The system of claim 32, wherein the local information receiving unit provides a button to receive user input to add a new sensor to the sensors.

36. The system of claim 32, being configured to determine whether a first one of the sensors operates properly based on a communication signal from the first one of the sensors to the local information receiving unit, and to provide a suggestion to change a location of the first one of the sensors, if it is determined that the first one of the sensors does not operate properly.

37. The system of claim 32, wherein:
the information collecting unit is configured to collect information from a web site in a Really Simple Syndication (RSS) format; and
the information processing unit is configured to perform image or sound processing of the information received by the local information receiving unit and the information collected by the information collecting unit.

38. The system of claim 32, wherein the system is configured to provide an interface for receiving user input setting a threshold temperature, the information processing unit being configured to determine, based on the threshold temperature, existence of an emergency situation, and to send a notification regarding the existence of the emergency situation.

* * * * *